United States Patent Office 3,510,242
Patented May 5, 1970

3,510,242
WATER INSOLUBLE DIOXAZINE DYESTUFF COMPOSITIONS COMPRISING THREE DIFFERENT DIOXAZINE COMPONENTS
Wilson J. Bryan, Jr., Charlotte, N.C., assignor to Martin-Marietta Corporation, a corporation of Maryland
No Drawing. Filed Jan. 27, 1967, Ser. No. 612,100
Int. Cl. C09b 19/02
U.S. Cl. 8—25      2 Claims

ABSTRACT OF THE DISCLOSURE

Water insoluble dioxazine dyestuff composition, comprising three distinct dioxazine components, resulting from heating 3,6 - dichloro - 2,5 - bis - (2',5' - dimethoxy-4' - chlorophenylamino) - 1,4 - benzoquinone in nitrobenzene or ortho-dichlorobenzene solvent in the presence of benzoyl chloride. Use of the product for pigment dyeing polystyrene and polyethylene films, and linear polyester textile fibers from dispersion by the thermosol method, in cerise shades, and the properties of the dyeings are also disclosed.

---

The present invention relates to dyestuffs, and more particularly to a water insoluble dioxazine dyestuff composition.

The product of the present invention may be briefly described as a water insoluble dioxazine dyestuff composition resulting from heating 3,6-dichloro-2,5-bis-(2',5'-dimethoxy - 4' - chlorophenylamino) - 1,4 - benzoquinone in nitrobenzene or ortho-dichlorobenzene solvent in the presence of benzoyl chloride. The suggested heating temperature is 140°–215° C. for 1–24 hours, and preferably about 210° C. for 6 hours.

The suggested weight ratio of the components is 4–15 parts, and preferably 12 parts, nitrobenzene or o-dichlorobenzene: 0.5–2 parts, and preferably 0.945 part, benzoyl chloride: each part 3,6-dichloro-2,5-bis-(2',5'-dimethoxy-4'-chlorophenylamino)-1,4-benzoquinone.

The dyestuff composition of the present invention is particularly suitable for pigment dyeing polystyrene film in cerise shades of excellent light fastness and very good heat stability, and disperse dyeing by the thermosol method linear polyester textile fibers derived from reaction of a polybasic acid and a dihydric alcohol, such as polyethylene terephthalate, in brilliant cerise shades, and may be used for pigment dyeing polyethylene film.

Brunner et al. U.S. Patent No. 2,092,387, issued Sept. 7, 1937, disclose preparing dioxazine compounds by heating certain diarylaminoquinones, in the presence or absence of a solvent such as nitrobenzene, and in the presence of aromatic acid chlorides to form dioxazine pigments of particularly good purity. A major disadvantage of these dioxazine pigments is that they are sulfonated by sulfuric acid, and hence cannot be dispersed by acid pasting. Moreover, most of these dyestuffs have less than desired tinctorial power for dyeing linear polyester textile fibers. The most pertinent example in Brunner is Example 10 thereof, which will be discussed in detail hereinafter.

Frey et al. U.S. Patent No. 3,036,071, issued May 22, 1962, disclose a process for manufacturing dioxazine pigments in which thionyl chloride is the condensing (ring closing) agent for certain diarylaminoquinones. They also disclose use of metal chlorides, such as aluminum chloride, for use in the ring closure. Surprisingly, I have found that if thionyl chloride or aluminum chloride is substituted for benzoyl chloride in the process for making the present product, entirely different and undesirable products result. For example, the product of the present invention dyes polyester (polyethylene terephthalate) fabric a desirable brilliant cerise shade. However, products produced by a similar process, except that thionyl chloride or aluminum chloride is substituted for benzoyl chloride, dye the same fabric undesirable dull reddish-blue violet and dull reddish violet shades, respectively. Moreover, infra-red spectrophotometric analysis and thin layer chromatography studies indicate that all three of the foregoing products are quite distinct from each other chemically.

British patent specification No. 879,519, published Oct. 11, 1961, discloses dyeing aromatic polyesters with dioxazine dyestuffs formed by ring closing certain diarylaminobenzoquinones, including 3,6 - dichloro - 2,5 - bis-(2',5' - dimethoxyphenylamino) - 1,4 - benzoquinone, which is the benzoquinone formed as an intermediate in Example 10 of the above Brunner et al. patent, during the process of converting chloranil and 1-amino-2,5-dimethoxybenzene to dioxazine dyestuff. This dioxazine product dyes linear polyester, polystyrene and polyethylene cerise shades, when prepared by the Brunner et al. process but isolated prior to sulfuric acid treatment. However, the primary disadvantages of the product are that it sulfonates in sulfuric acid and therefore cannot be dispersed by acid pasting, has less than desirable tinctorial power in dyeing polystyrene and polyethylene films, and has less than desirable light fastness when used to dye polystyrene.

According to the present invention, the above disadvantages and limitations of the prior art have been overcome, and additional advantages have been provided, as follows. The product of the present invention is soluble in but does not sulfonate in sulfuric acid, and therefore it may be dispersed by acid pasting, which is a distinct economic advantage in preparing dispersions for dyeing. The product of the present invention produces deep cerise dyeings in polystyrene film or polyethylene film, and has remarkably great tinctorial power for dyeing these films, for example about twice the tinctorial power in dyeing polystyrene as the dyestuff prepared by substituting 3,6-dichloro - 2,5 - bis    (2',5' - dimethoxyphenylamino)-1,4-benzoquinone for the benzoquinone used in making the present product. Also, the product of the present invention has excellent light fastness when used to dye polystyrene, and is remarkably superior in that respect to the dyestuff made from the above 3,6-dichloro-2,5-bis-(2',5' - dimethoxyphenylamino) - 1,4 - benzoquinone. Moreover, the product of the present invention has very good heat stability when dyed on polystyrene, for example polystyrene so dyed does not discolor or decompose on heating at 500° F. for 10 minutes and shows only a very slight color loss. Finally, the present product also produces excellent dyeings on linear polyester textile fibers, which will be described in detail hereinafter.

The following is a detailed description of the product of the present invention and method for making same.

The dyestuff composition of the present invention is a water insoluble dioxazine dyestuff composition resulting from heating 3,6 - dichloro-2,5-bis-(2',5' - dimethoxy-4'-chlorophenylamino)-1,4-benzoquinone in nitrobenzene or ortho-dichlorobenzene solvent in the presence of benzoyl chloride. The suggested heating temperature of the 3,6-dichloro-2,5 - bis-(2',5' - dimethoxy - 4' - chlorophenylamino)-1,4-benzoquinone is 140°–215° C. for 1–24 hours, and preferably about 210° C. for 6 hours.

The suggested weight ratio of the components is 4–15 parts, and preferably 12 parts, nitrobenzene or o-dichlorobenzene: 0.5–2 parts, and preferably 0.945 part, benzoyl chloride: each part 3,6-dichloro-2,5-bis-(2',5'-dimethoxy-4'-chlorophenylamino)-1,4-benzoquinone.

Surprisingly, thin layer chromotogram studies using chloroform solvent on silica gel media show that the present product comprises three distinct components and a trace residue. Infra-red spectrophotometric studies of the 3,6-dichloro-2,5-bis-(2′,5′-dimethoxy-4′-chlorophenylamino)-1,4-benzoquinone intermediate used in making the present product show absorbency bands for quinoid oxygen and secondary amine, and no absorbency band for carbonyl, contrasted to infra-red spectrophotometric studies of the dyestuff composition of the present invention, which show absence of quinoid oxygen, C—N linkages without a proton (indicating presence of tertiary amine), and a carbonyl band, all of which together indicates that the product of the present invention comprises three different dioxazine components, at least one of which is benzoylated in at least one position.

Infra-red spectrophotometric studies and thin layer chromotogram studies also indicate that the product of the present invention differs substantially from products made by the same method for making the product of the present invention, except substituting thionyl chloride or aluminum chloride for the benzoyl chloride. For example, thin layer chromatography shows four distinct components and a large residue and infra-red shows absence of carbonyl bands in the product made with aluminum chloride, and eight distinct components and a large residue and absence of carbonyl bands in the product made with thionyl chloride. It has already been indicated above that the present product and these above products, made with thionyl chloride and aluminum chloride, surprisingly each dye polyester different shades from each other.

In preparing the product of the present invention, there is the alternative of either isolating or not isolating the 3,6-dichloro-2,5-bis-(2′,5′ - dimethoxy - 4′ - chlorophenylamino)-1,4-benzoquinone during the process of preparing it. That is to say, one may first prepare the 3,6-dichloro-2,5-bis-(2′,5′ - dimethoxy - 4′ - chlorophenylamino)-1,4-benzoquinone and proceed in the same vessel without first isolating it to the dyestuff composition without first isolating the 3,6-dichloro-2,5-bis-(2′,5′-dimethoxy-4′-chlorophenylamino)-1,4-benzoquinone, or the benzoquinone may be isolated and subsequently converted to the dyestuff composition.

3,6 - dichloro - 2,5 - bis - (2′,5′-dimethoxy-4′-chlorophenylamino) - 1,4 - benzoquinone is prepared by condensing, throuph heating, 2 g. M.W. 2,5-dimethoxy-4-chloroaniline with each g. M.W. of chloranil in the presence of an acid binding agent, such as sodium acetate, and in the presence of an organic solvent such as isopropyl alcohol, o-dichlorobenzene, or nitrobenzene. This condensation may be conducted at about 60°–215° C. for 1–24 hours, and preferably about 13 hours at 84° C. with isopropyl alcohol if the benzoquinone is to be isolated. To isolate the 3,6-dichloro-2,5-bis-2′,5′-dimethoxy-4′-chlorophenylamino)-1,4-benzoquinone, the resulting solids may be recovered by filtration, washed with isopropyl alcohol and then with water, and stored dry or as moist press cake, and subsequently used for preparing the dyestuff composition.

If the dyestuff composition is to be prepared without first isolating the 3,6-dichloro - 2,5-bis-(2′,5′-dimethoxy-4′-chlorophenylamino)-1,4-benzoquinone, either nitrobenzene or o-dichlorobenzene will be selected as the solvent for use in preparing the 3,6-dichloro-2,5-bis-(2′,5′-dimethoxy-4′-chlorophenylamino) - 1,4 - benzoquinone for reasons of economy in that the same solvent will subsequently serve for converting the 3,6-dichloro-2,5-bis-2′,5′-dimethoxy - 4′ - chlorophenylamino)-1,4-benzoquinone to the dyestuff composition and also because isopropyl alcohol would reaction undesirably with benzoyl chloride. In this process, the 3,6-dichloro-2,5-bis-(2′,5′-dimethoxy-4′-chlorophenylamino) - 1,4 - benzoquinone may be prepared by heating the chloranil, 2,5-dimethoxy-4-chloroaniline, sodium acetate and nitrobenzene or o-dichlorobenzene for about 1–24 hours at 60°–215° C., optionally removing the acetic acid formed during the process, followed by adding the benzoyl chloride and heating to 140°–215° C. for about 1–24 hours until the dyestuff composition is formed. Preferably, the 3,6-dichloro-2,5-bis-(2′,5′-dimethoxy-4′-chlorophenylamino) - 1,4 - benzoquinone is prepared by heating the chloranil, 2,5-dimethoxy-4-chloroaniline, sodium acetate and nitrobenzene at about 120° C. under vacuum until all the acetic acid has distilled off; following which the benzoyl chloride is added thereto gradually at 140°–215° C., preferably at reflux, and heating is continued in this range, and conveniently at reflux which is about 210°–215° C. for nitrobenzene and about 180°–185° C. for o-dichlorobenzene, until the dye product is formed in about 1–24 hours.

The resulting water insoluble dioxazine dyestuff composition may be recovered as solids by filtration, and subsequently washed with isopropyl alcohol, then with water and dried.

The product may be dispersed for use as a colorant by the conventional means, such as salt grinding, sand grinding, ball milling, acid pasting, or a combination thereof.

The following are illustrative examples embodying the present invention, in which all parts are by weight unless otherwise specified.

EXAMPLE 1

11.4 gms. 97% chloranil, 16.9 gms. 98.2% 2,5-dimethoxy-4-chloroaniline, and 7.4 gms. sodium acetate, are mixed into 360 gms. isopropyl alcohol at room temperature, and the mass heated at reflux (84° C.) for 13 hours. The mass is cooled to 35° C. and resulting solids recovered by filtration, washed with 60 gms. isopropyl alcohol, then washed with water at 70°–80° C. until filtrate is clear and free of chlorides. The resulting 3,6-dichloro-2,5-bis-(2′,5′-dimethoxy - 4′ - chlorophenylamino) - 1,4-benzoquinone solids are dried at 80°–90° C.

18.4 gms. of the above, 3,6-dichloro-2,5-bis-(2′,5′-dimethoxy - 4′ - chlorophenylamino) - 1,4 - benzoquinone is added to 148 gms. o-dichlorobenzene at room temperature. The mixture is evenly heated to 160° C. during 2.5 hours, and while maintaining 160°–165° C., 17.75 gms. benzoyl chloride is added evenly during 1.5 hours, and the mass is held at 160°–165° C. for 12 additional hours. The mass is cooled to 30° C. and the solids recovered by filtration, the solids washed with 150 gms. isopropyl alcohol, then washed with water at 70°–80° C. until the run-off is clear. The resulting dioxazine dyestuff composition of the present invention is dried at 80°–90° C.

EXAMPLE 2

95.4 gms. 97% chloranil, 140.8 gms. 2,5-dimethoxy-4-chloroaniline, and 61.5 gms. sodium acetate are mixed into 3,500 ml. isopropyl alcohol at room temperature, and the mass heated at reflux (84° C.) for 13 hours. The mass is cooled to room temperature and the resulting solids recovered by filtration and washed with 500 ml. isopropyl alcohol, then washed with 1,000 ml. water at room temperature, and finally washed with 4,000 ml. water at 60°–70° C. The resulting 3,6-dichloro-2,5-bis-(2′,5′ - dimethoxy - 4′ - chlorophenylamino) - 1,4 - benzoquinone solids are dried at 80°–100° C.

75 gms. of the 3,6-dichloro-2,5-bis-(2′,5′-dimethoxy-4′-chlorophenylamino)1,4-benzoquinone is added to 900 gms. nitrobenzene at room temperature. The mixture is heated to reflux (about 210°–215° C.), and while vigorous reflux is maintained 70.8 gms. benzoyl chloride is added thereto dropwise during one hour. Reflux is maintained for 5 additional hours. The mass is cooled to room temperature and the solids recovered by filtration, washed with 300 ml. isopropyl alcohol at room temperature, washed with 1,500 ml. water at room temperature and then dried at 80°–100° C. The dioxazine dyestuff composition of the present invention results.

EXAMPLE 3

95.4 gms. 97% chloranil, 140.8 gms. 2,5-dimethoxy-4-chloroaniline, and 61.5 gms. sodium acetate are mixed into 1800 gms. of nitrobenzene at room temperature, and the mass is heated evenly during 30 minutes to 80° C., and further heated evenly during another 30 minutes to 120° C.

The mass is then heated at 120° C. under vacuum until the acetic acid has distilled off.

The mass is heated to reflux (about 210°–215° C.) and while maintaining vigorous reflux 131 gms. benzoyl chloride is added thereto dropwise during one hour. Reflux is maintained for 8 additional hours. The mass is cooled to room temperature, the solids recovered by filtration, washed with 500 ml. isopropyl alcohol at room temperature, then washed with water at 70°–80° C. until run-off is clear and free of chlorides, and dried at 80°–100° C. to form the dioxazine dyestuff composition of the present invention.

EXAMPLE 4

This example is the same as Example 2 above, except that 1500 gms. o-dichlorobenzene is substituted for the nitrobenzene, and except that reflux is at about 180°–185° C. instead of 210°–215° C.

EXAMPLE 5

This example is the same as Example 3 above, except that 1600 gms. o-dichlorobenzene is substituted for the nitrobenzene, except that reflux is at about 180°–185° C., and except that reflux is maintained for 15 additional hours instead of 8 additional hours.

The following relates to using the product of the present invention.

The dyestuff composition of the present invention may be dispersed by salt grinding for application to polystyrene or polyethylene as follows. Charge into a Baker-Perkins mixer 600 gms. NaCl pulverized to pass a U.S. 200 mesh screen (74 microns) and essentially free of copper, chromium, iron, calcium and magnesium, 20 gms. dried dyesuff of Example 1 above, 90 gms. diethylene glycol, and grind 20 hours, whereupon the dyestuff particles will average less than 1 micron. Transfer the resulting mass to a beaker; add 2 kg. $H_2O$ and 120 gms. 32% aqueous HCl; stir at room temperature one hour; heat at 75° C. one hour; filter off solids at 75° C.; wash solids with water at tap temperature until run-off is chlorides free; and dry solids at 47°–55° C. in a vacuum oven. Grind the resulting dyestuff composition with mortar and pestal until it passes a U.S. 200 mesh screen.

0.1 gm. of the above screened dyestuff composition is dispersed uniformly into 500 gms. polyethylene having a 2.0 Melting Index, or into 50 gms. general purpose polystyrene, by rolling the dye and either the polyethylene or polystyrene between two stainless steel rollers having one roller heated to 121° C. and the other to 110° C. A dyed film disc of uniform thickness is then prepared by pressing at 23,000 p.s.i. pressure 6 gms. of the rolled and colored polystyrene or polyethylene between flat chrome coated steel plates heated to 149° C. Deep cerise dyeings result. The resulting polystyrene dyeing has excellent light fastness (more than 100 hours in the Fade-Ometer® carbon arc light fastness testing machine), and also has very good heat stability. In contrast, the cerise dyestuff made by substituting 3,6-dichloro-2,5 - bis - (2',5' - dimethoxyphenylamino) - 1,4 - benzoquinone for the benzoquinone used in the present process has less than 60 hours light fastness, measured on the Fade-Ometer® when applied to polystyrene exactly as above. The tinctorial power of the present dyestuff is substantially greater in dyeing polystyrene or polyethylene than that of the dyestuff prepared by substituting 3,6 - dichloro - 2,5 - bis - (2',4' - dimethoxyphenylamino)-1,4-benzoquinone for the benzoquinone used in the present process; in dyeing polyethylene, the presence product has about twice the tinctorial power of the other product.

The dyestuff of the present invention may be dispersed into fine particle size by the known acid pasting method. For example, dissolve the dye in concentrated $H_2SO_4$, stir the result in ice and water at 20°–30° C., and wash the dispersed dyestuff free of acid. The dyestuff prepared by substituting 3,6-dichloro-2,5-bis-(2',5'-dimethoxyphenylamino)1,4-benzoquinone for the benzoquinone used in the present process may not be dispersed by acid pasting, but is sulfonated by the acid pasting process.

An aqueous dispersion of the dyestuff composition for dyeing linear polyester textile fibers may be prepared as follows. 25 gms. of the dry dye composition of Example 1 is dissolved by stirring it into 250 ml. 96%–98% $H_2SO_4$ maintained at 20°–30° C. The solution is poured, with stirring, into 2,000 ml. water while simultaneously adding ice to maintain 20°–30° C., thereby precipitating the dyestuff in fine particle size. The solids dyestuff is isolated by filtration and washed with water at room temperature until free of acid. The resulting moist press cake, 7.5 gms. naphthaleneformaldehyde solfonate dispersing agent, and enough water to give a total weight of 250 gms. are charged into a ball mill, and the composition is ball milled until maximum particle size of the dyestuff is less than 3 microns. A 10% dispersion of the dyestuff results.

Fabric is dyed as follows. The padding liquor is prepared by mixing together 2 oz. of the above 10% aqueous dye dispersion, 0.2 oz. sodium alginate migration inhibitor, and enough water to bring to one gallon. Dacron® linear polyester poplin fabric is passed through the pad liquor at room temperature and squeezed to 60% wet pick up based on fabric weight, pre-dried to substantial dryness, whereafter the dye is fixed by exposing the fabric to dry heat of 415° F. for 90 seconds, whereafter any residual surface dye may optionally be cleared by immersing the dyeing for 10 minutes in 2 oz. 50% NaOH and 2 oz. $Na_2S_2O_4$ per gallon of water at 140° F. and then rinsing with water, soaping, rinsing and drying. A brilliant cerise dyeing results. The resulting dyeing has excellent fastness to No. 3 A.A.T.C.C. wash test, no sublimation at 400° F. for 30 seconds, and excellent light fastness (break at 60 hours in the Fade-Ometer®).

Another dyeing was made, substituting blended 65% Dacron® linear polyester/35% cotton fabric for the 100% linear polyester in the above process. This brilliant cerise dyeing had excellent fastness to gas (oxides of nitrogen), ozone, No. 3 A.A.T.C.C. wash test, sublimation (no sublimation at 400° F. for 30 seconds and very little sublimation 455° C. for 1 minute), and light (commences breaking at 60 hours in the Fade-Ometer®), and very good fastness to alkaline perspiration, acid perspiration, and dry cleaning.

In addition, a portion of the above dyed polyester/cotton blended fabric was subjected to Koratron® permanent press treatment (U.S. Patent No. 2,974,432) with dimethylol dihydroxy ethylene urea resin. The resination caused a barely perceptible shade change, but did not alter the light, wash, gas, ozone, or acid and alkaline perspiration fastness properties of the unresinated blended fabric.

In addition, the dyestuff of the present invention has excellent tinctorial power and excellent shade building ability for dyeing linear polyester fabric.

What is claimed is:

1. Water insoluble dioxazine dyestuff composition comprising three different dioxazine components, at least one of which dioxazine components is benzoylated in at least one position, resulting from heating at 140°–215° C. for 1–24 hours 4–15 parts nitrobenzene or ortho-dichlorobenzene: 0.5–2 parts benzoyl chloride: each part 3,6-dichloro - 2,5 - bis-(2',5'-dimethoxy-4'-chlorophenylamino)-1,4-benzoquinone, wherein all parts are by weight.

2. Composition as defined in claim 1, and further characterized in that the heating is at 160°–165° C. for 13.5 hours, and in that the weight ratio of the parts heated is 8 parts ortho-dichlorobenzene: 0.96 part benzoyl chloride: each part 3,6-dichloro-2,5-bis-(2',5'-dimethoxy-4'-chlorophenylamino)-1,4-benzoquinone.

References Cited

UNITED STATES PATENTS 2,092,387 9/1937 Brunner et al. _____ 260—246
3,036,071 5/1962 Frey et al. _____ 260—246

FOREIGN PATENTS 420,683 12/1934 Great Britain.

DONALD LEVY, Primary Examiner
T. J. HERBERT, JR., Assistant Examiner

U.S. Cl. X.R.

8—4, 17, 21, 162, 176, 179, 180; 260—41, 246

UNITED STATES PATENT OFFICE

CERTIFICATE OF CORRECTION

Patent No. 3,510,242

May 5, 1970

Wilson J. Bryan, Jr.

It is certified that error appears in the above identified patent and that said Letters Patent are hereby corrected as shown below:

Column 3, line 44, "throuph" should read -- through --; line 66, "2',5'" should read -- (2',5' --. Column 4, line 37, "18.4" should read -- 18.5 --; line 65, "4'-chlorophenylamino)1,4" should read -- 4'-chlorophenylamino)-1,4 --. Column 5, line 73, "(2'4' " should read -- (2',5' --. Column 6, line 8, "ylamino)1,4" should read -- ylamino)-1,4 --; line 49, before "455°" insert -- at --.

Signed and sealed this 29th day of December 1970.

(SEAL)
Attest:

Edward M. Fletcher, Jr.
Attesting Officer

WILLIAM E. SCHUYLER, JR.
Commissioner of Patents